United States Patent
McMahan et al.

(10) Patent No.: US 9,990,784 B2
(45) Date of Patent: Jun. 5, 2018

(54) DYNAMIC IDENTIFICATION BADGE

(71) Applicant: Hand Held Products, Inc., Fort Mill, SC (US)

(72) Inventors: Ryan J. McMahan, Cedar Rapids, IA (US); Robert Arlan Kohtz, Cedar Rapids, IA (US); Jason B. Schoon, North Liberty, IA (US); Eric P. Mielke, Sterling, VA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days. days.

(21) Appl. No.: 15/016,312

(22) Filed: Feb. 5, 2016

(65) Prior Publication Data
US 2017/0229071 A1    Aug. 10, 2017

(51) Int. Cl.
*G07C 9/00* (2006.01)
*G06K 9/00* (2006.01)
*G09G 3/34* (2006.01)

(52) U.S. Cl.
CPC ..... *G07C 9/00079* (2013.01); *G06K 9/00221* (2013.01); *G09G 3/344* (2013.01); *G07C 9/00015* (2013.01); *G07C 9/00111* (2013.01)

(58) Field of Classification Search
None
See application file for complete search history.

(56) References Cited

U.S. PATENT DOCUMENTS

| | | | |
|---|---|---|---|
| 6,025,780 A * | 2/2000 | Bowers | G06K 19/0701 340/10.51 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,536,721 B2 | 5/2009 | Stevens et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Leon-Viet Nguyen
(74) *Attorney, Agent, or Firm* — Additon, Higgins & Pendleton, P.A.

(57) ABSTRACT

A presentation of visual information relates to an accurate identity of a person. Visible data corresponding to the identity is rendered upon a wearable badge associated uniquely with the person. The rendered visible data are augmented dynamically. The augmentation includes adding a conspicuous indication to the rendered visible data, in real time, that an authorized security credential corresponding to the person is exceeded in relation to a presence of the person in a particular location.

19 Claims, 7 Drawing Sheets

(56) References Cited

U.S. PATENT DOCUMENTS

| | | |
|---|---|---|
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |

(56) References Cited

U.S. PATENT DOCUMENTS

| | | |
|---|---|---|
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2007/0063048 A1 | 3/2007 | Havens et al. |
| 2008/0309508 A1* | 12/2008 | Harmon ............... G06F 1/1626 340/686.1 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0025747 A1 | 1/2014 | Sarkar et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |

(56) References Cited

U.S. PATENT DOCUMENTS

| | | |
|---|---|---|
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232632 A1 | 8/2014 | Hodges et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0266590 A1* | 9/2014 | Guillaud ............ G07C 9/00119 340/5.65 |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0379426 A1* | 12/2016 | Tholen ............ G07C 9/00015 340/5.21 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 14 pages.

U.S. Appl. No. 29/530,600 for Cyclone filed Jun. 18, 2015 (Vargo et al); 16 pages.

(56) References Cited

OTHER PUBLICATIONS

U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch Fora Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Motorola, specification sheet "SB1 Smart Badge", Oct. 2013, U.S.A., pp. 1-2.
Motorola, brochure "The Motorola SB1 Smart Badge", Dec. 2012, U.S.A., pp. 1-8.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

* cited by examiner

DYNAMIC IDENTIFICATION BADGE

TECHNOLOGY FIELD

The present invention relates generally to personnel identification. More particularly, example embodiments of the present invention relate to an identification badge.

BACKGROUND

Generally speaking, large facilities may employ, harbor, and/or shelter significant numbers of personnel. Be they employees, contractors, registered visitors, identified customers, patients, guests, inmates, or others, the various personnel may number from dozens, to hundreds or more. Even well trained, highly motivated, educated, dedicated, and vigilant security forces, with sophisticated automated security systems in place, may have their capabilities taxed or challenged to identify all of the personnel present in large facilities.

Moreover, general personnel (e.g., detailed to pursuits and endeavors other than security, per se), even with sound memories and heightened levels of general vigilance, cannot be expected to know everyone around them in such facilities, at least beyond more or less familiar colleagues and/or other personnel with whom they may have frequent or typical contact. These challenges may be exacerbated in facilities with high personnel turnover, churn, and/or task related location changing throughput.

Identification (ID) badges may help in these regards, as they may typically present a visible representation of a person's likeness and associated identity related data. However, typical ID badges are unable to show recent changes to an employee's appearance, or indicate if a security credential corresponding to the person may be exceeded, for example, in relation to authority to access various locations within the facility. In this context, the ID badges perform a static function of passively showing an unchanging (and indeed, unchangeable with respect to real time) likeness of how a person appeared when the badge was made.

Large facilities with high personnel populations may also be associated with significant amount of message traffic. The message traffic may relate to notifications, alerts, pages, and other messages. The messages may be directed to a particular person, or to a small group of persons, relative to the personnel population at large. Some of the messages, such as alarms, may also relate to situations of particular interest to security personnel and in many cases, may be more advantageously directed with a degree of exclusivity to security related personnel.

Message traffic in large facilities, however, may be broadcast generally over an array of loudspeakers. Presented at high (and in some situations and locations disturbing) acoustic volumes, the broadcast messages add to an overall volume of ambient sound within large facilities, which may already comprise a significant volume. The increased ambient sound level may simply be ignored, or "tuned-out" by personnel present therein.

Ignoring the message traffic, however, may cause relevant messages to be missed by personnel to whom it may be directed, and missing messages with urgent and/or important content may have costs and consequences. Moreover, the increased ambient sound level, especially at disturbingly high levels of acoustic volume and frequency of occurrence, may be disruptive in relation to the focus and concentration of the attention of personnel on whatever tasks may be at hand, with concomitant negative effects on productivity, efficiency, attention to detail, precision, accuracy, and/or quality.

It could be useful, therefore, to provide accurate, up to date information relating to identifying a person using an ID badge. It could also be useful for the identification information to relate to security information relevant throughout a large facility and all of the locations disposed therein. It could be useful, further, to provide timely information relevant to a particular person, among a large population of other persons, and including messages directed to that particular person, without adding to the volume of ambient noise within a facility, and/or drawing attention from other personnel to whom the message does not relate.

SUMMARY

Accordingly, in one aspect, an example embodiment of the present invention relates to providing accurate, up to date information relating to identifying a person using an ID badge. In an example embodiment, the identification information is related to security information relevant throughout large facilities, and over all of the locations the facility may comprise. Example embodiments, further, are operable for providing timely information relevant to a particular person (or relatively small group of persons), among a large population of other persons. The information provided comprises messages directed to that particular person (or small group). The information is provided without adding to the volume of ambient noise within a facility, and without drawing attention from other personnel to whom the message does not relate.

An example embodiment of the present invention relates to a method for presenting visual information relating to an accurate identity of a person. Visible data corresponding to the identity is rendered upon a wearable badge associated uniquely with the person. The rendered visible data are augmented dynamically. The dynamic augmentation comprises adding a conspicuous indication to the rendered visible data, in real time, that an authorized security credential corresponding to the person is exceeded in relation to a presence of the person in a particular location. An example embodiment relates to a non-transitory computer readable storage medium comprising instructions, which when executed by a processor, are operable for performing a process, such as the method described herein.

An example embodiment of the present invention relates to a device operable for presenting visual information relating to an accurate identity of a person. The device is disposed with an identification (ID) badge associated uniquely the person identified therewith.

An example embodiment of the present invention relates to a security system. The security system comprises a network, a database, and a plurality of devices. Each of the devices is disposed with an ID badge operable for presenting visual information relating to an accurate identity of a person with whom it is uniquely associated. One of the ID devices is disposed with an ID badge associated uniquely a particular person identified therewith.

The foregoing illustrative summary, as well as other example features, functions and/or aspects or features of embodiments of the invention, and the manner in which the same may be implemented or accomplished, are further explained within the following detailed description of example embodiments and each figure ("FIG.") of the accompanying drawings referred to therein.

DESCRIPTION OF EXAMPLE EMBODIMENTS

Figure 1A:
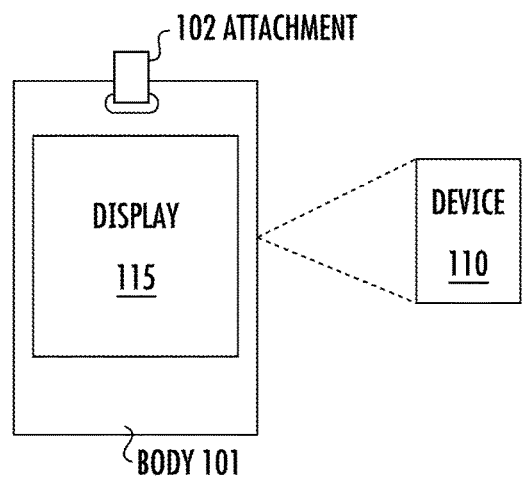
FIG. 1A depicts an example badge, according to an embodiment of the present invention.

Example embodiments of the present invention are described in relation to methods, devices, and systems for presenting visual information relating to an accurate identity of a person. Visible data corresponding to the identity is rendered upon a wearable badge associated uniquely with the person. The rendered visible data are augmented dynamically. The dynamic augmentation comprises adding a conspicuous indication to the rendered visible data, in real time, that an authorized security credential corresponding to the person is exceeded in relation to a presence of the person in a current location.

Overview.

Example embodiments of the present invention relate to providing accurate, up to date information relating to identifying a person using an ID badge. In an example embodiment, the identification information is related to security information relevant throughout large facilities, and over all of the locations the facility may comprise. Example embodiments, further, are operable for providing timely information relevant to a particular person (or relatively small group of persons), among a large population of other persons. The information provided comprises messages directed to that particular person (or small group). The information is provided without adding to the volume of ambient noise within a facility, and without drawing attention from other personnel to whom the message does not relate.

An example embodiment of the present invention relates to a method for presenting visual information relating to an accurate identity of a person. Visible data corresponding to the identity is rendered upon a wearable badge associated uniquely with the person. The rendered visible data are augmented dynamically. The dynamic augmentation comprises adding a conspicuous indication to the rendered visible data, in real time, that an authorized security credential corresponding to the person is exceeded in relation to a presence of the person in a particular location.

An entry of the person into the particular location may be detected. The conspicuous indication is added to an original rendering of the visible data in real time upon the detection.

The conspicuous indication added to the rendered visible data in real time may comprise a distinctive symbol superimposed over the rendered upon the detection of an entry of the person into the current location. An indication, such as a silent alarm, corresponding to the entry may also be annunciated upon the detection.

The visible data corresponding to the person may comprise a photograph corresponding to a likeness of the person. The dynamic augmenting of the rendered visible data may comprise superimposing the conspicuous indication over the photograph. The dynamic augmenting of the rendered visible data may also comprise dynamically refreshing the photograph based on a change related to the likeness of the identified person.

The dynamic augmenting of the rendered visible data may comprise exchanging data signals via a communication network. The augmenting of the rendered visible data may comprise updating and/or refreshing the rendered visible data. The data signals exchanged over the communication network relate to the updating and/or refreshing. In an example embodiment, the data signals exchanged over the communication network relate to reporting a position of the badge, and thus, to tracking a location of the person.

An example embodiment of the present invention relates to a device for presenting visual information relating to an accurate identity of a person with whom the device is uniquely associated. The device comprises a badge. The badge comprises a body, and an attachment coupled to the body and disposed to provide for wearing the device. A display is disposed within the badge body. The display is operable for rendering visible data corresponding to the identity of a person associated uniquely with the device. The device is operable, further, for augmenting the rendered visible data dynamically, wherein a conspicuous indication is added to the rendered visible data in real time. The conspicuous indication relates to a presence of the person in a particular location, which exceeds an authorized security credential corresponding to the person.

In an example embodiment, the display comprises an electronic paper (E-paper) medium and the visible data rendered by the display comprises a mark rendered on the E-paper with an electrophoretic ink (e-ink).

The device may comprise, further, a processor, a transceiver, and an electrical power source, such as a battery. The processor is operable for controlling the display in relation to the rendering and augmenting of the visible data. The transceiver is operable for exchanging data signals with the processor and over a communication network. The data signals relate to the augmenting of the visible data. The electrical power source is operable for energizing the display, the processor, and/or the transceiver. The device may also comprise a non-transitory computer-readable storage medium, associated for example, with the processor.

The device may be operable in relation to a detection of an entry of the person into the current location. Upon the detection of the entry, an indication related thereto, such as a silent alarm, is annunciated.

In an example embodiment, the visible data corresponding to the identified person may comprise a photograph, which comprises a likeness of the identified person. The conspicuous indication added to the rendered visible data may comprise a distinctive symbol, such as a bright and colored (e.g., red, orange, etc.) 'X' symbol, superimposed over the photograph of the person upon the detection of the entry.

In an example embodiment, the dynamic augmenting of the rendered visible data may also comprise dynamically refreshing the photograph, and/or updating the photograph based on a change related to the likeness of the identified person, such as changing hair and beard styles, colors, etc.

The display may be operable, further, for rendering a notification, an alert, and/or a message relating to the person. In an example embodiment, the device comprises, further, a sensor. The sensor is operable for detecting an orientation of the badge. In a first detected orientation (e.g., in which the badge is worn right-side-up and facing outward with respect to displaying the rendered photograph, etc.), the display is operable for the rendering of the visible data corresponding to the identity. In a second detected orientation (e.g., in which the badge is "flipped-up" for observation by the person wearing the badge and facing outward with respect to displaying the rendered photograph, etc.), the display is operable for the further rendering of the notification, alert, and/or message.

An example embodiment of the present invention relates to a security system. The security system comprises a network, over which data signals may be communicated in real time. A database is coupled to the network. The database comprises information relating to an identity, and an associated status, corresponding uniquely to each of a plurality of persons. A plurality of devices is operable for exchanging the data signals with the database over the network. Each of the devices is associated uniquely with a particular one of the persons.

Each of the devices is operable for rendering visible data corresponding to the identity and the associated status of the particular one of the persons upon a wearable badge associated uniquely with that particular person. Each of the devices is operable, further, for augmenting the rendered visible data dynamically.

The status associated with the particular person comprises a corresponding authorized security credential in relation to a presence of the particular person in each of a plurality of locations. Upon the augmenting, a conspicuous indication is added to the rendered visible data, in real time. The conspicuous indication relates to the presence in a particular one of the locations exceeding the authorized security credential corresponding to the particular person.

Example Device.

An example embodiment of the present invention relates to a device for presenting visual information relating to an accurate identity of a person with whom the device is uniquely associated. The device comprises a badge. FIG. 1A depicts an example badge 100, according to an embodiment of the present invention.

The badge 100 comprises a body 101. An attachment 102 is coupled to the body 101 and disposed to provide for wearing the device. For example, the attachment 102 may comprise a clip operable for attaching the badge 100 to the clothes worn by a person. In an example embodiment, the badge 100 is uniquely associated with the person.

The badge body 101 may comprise a durable casework. The casework may comprise inert and heat resistant materials. The casework may be configured for operably sustaining and surviving drops, splashes, exposure to rain, typically encountered climate, environmental materials, and contaminants, such as dust, dirt, and grime, biologicals, some chemical agents. The casework may comprise an electrically insulating dielectric material. The casework may be transparent to electromagnetic radiation at one or more radio frequency (RF) and optical frequencies within visible and infrared (IR) bands. The casework may also comprise a material impervious or resistant to damage and/or appearance and durability changes that may relate repeated or sustained ultraviolet (UV) or repeated X-Ray or gamma radiation exposure.

A display 115 is disposed within the body 101 to be visible from a surface of the badge 100. The display 115 is operable for rendering visible data corresponding to the identity upon the badge 100. For example, the display may render a photograph of the person, which comprises a likeness of the person with whom the badge 100 is uniquely associated, as well as other information associated with that person.

The other information may comprise, for example, security related data corresponding to the identity of the person with whom the badge 100 is uniquely associated ("identified person"). The information may also comprise notifications, messages, and/or alerts, which may be promulgated specifically for the identified person. For example, the badge 100 may be worn, suspended from the by the attachment 102, from an article of clothing worn by the person in either of two positions.

Figure 4:
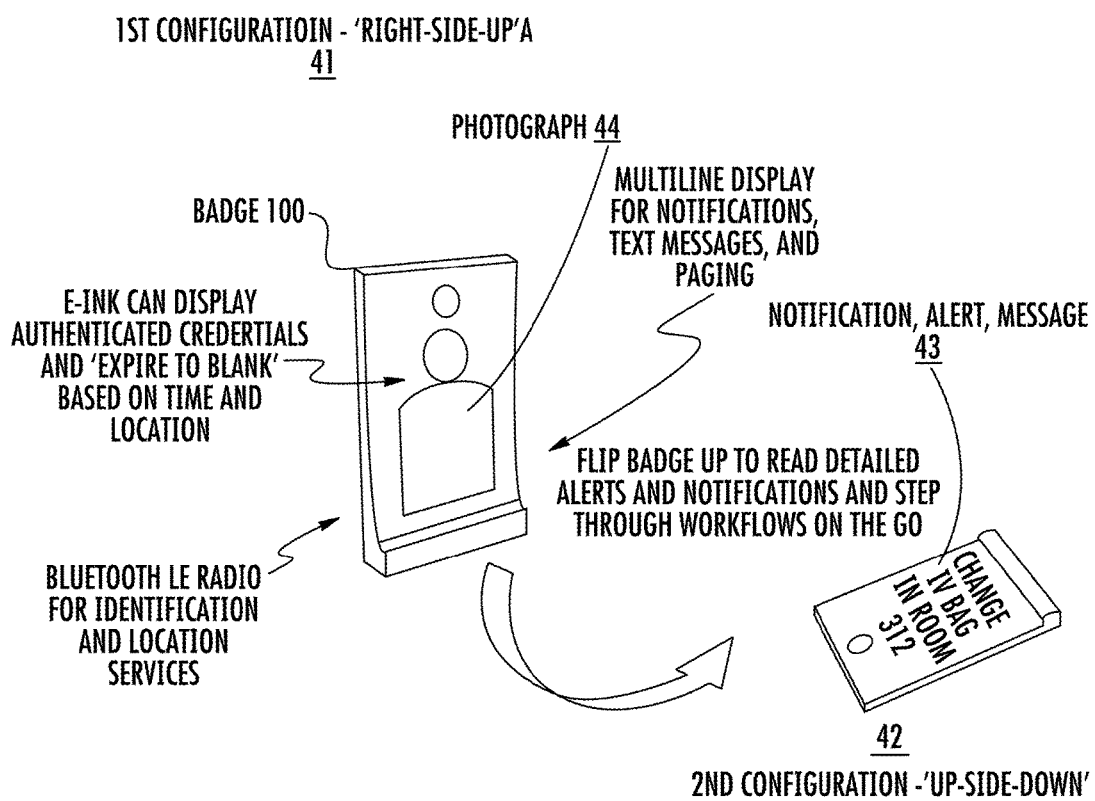
FIG. 4 depicts an example first use scenario, according to an embodiment of the present invention.

FIG. 4 depicts an example first use scenario 40, according to an embodiment of the present invention. In a position in which the badge 100 is typically worn for a significant portion of wear time, the badge 100 may be suspended from the attachment 102 in a first, 'right-side-up' configuration 41. In the first configuration 41, the display 115 renders the photograph 44 of the person, and the associated security related data, to be visible to other persons viewing the badge 100.

The person wearing the badge 100 may also flip the badge upward into a second, 'upside-down' configuration 42. In the second configuration 42, the display 115 may render the notifications, messages, and/or alerts 43, to be visible, e.g., readably, to the person wearing the badge 100. The alerts, notifications, and/or messages 43 may be rendered by the display 115 responsive to wireless signals sent to the badge 100.

Figure 1B:
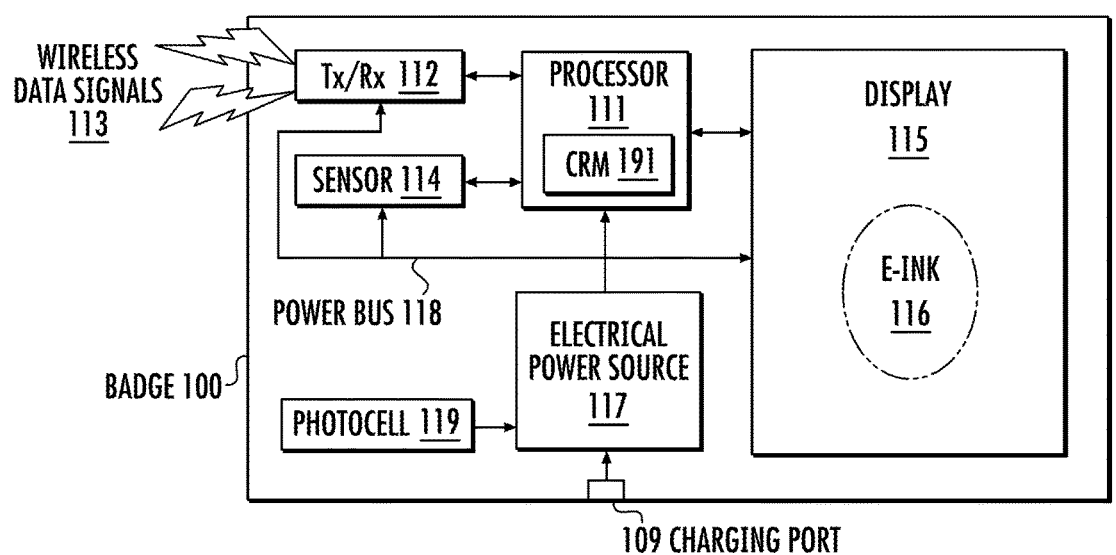
FIG. 1B depicts an example device operable for presenting visual information relating to an accurate identification of a person, according to an embodiment of the present invention.

FIG. 1B depicts an example device 100 operable for presenting visual information relating to an accurate identification of a person, according to an embodiment of the present invention. The device 110 comprises the display 115. The display 115 is disposed, with a visible viewing surface, within the badge body 101. In an example embodiment, the display 110 comprises an E-Paper medium. The visible data 116 rendered by the display 115 comprises a mark 116 rendered on the E-paper with e-ink.

The display 110 is operable for rendering visible data corresponding to the identity of a person associated uniquely with the device, and for augmenting the rendered visible data dynamically. The display 110 is operable, further, for adding a conspicuous indication to the rendered visible data in real time that an authorized security credential corresponding to the person is exceeded in relation to a presence of the person in a particular location.

For example, the device 110 may be operable in relation to a detection of an entry of the person into the particular location. Upon the detection of the entry, the conspicuous indication may be rendered, and a silent alarm may be annunciated, as indications related thereto.

Figure 6:
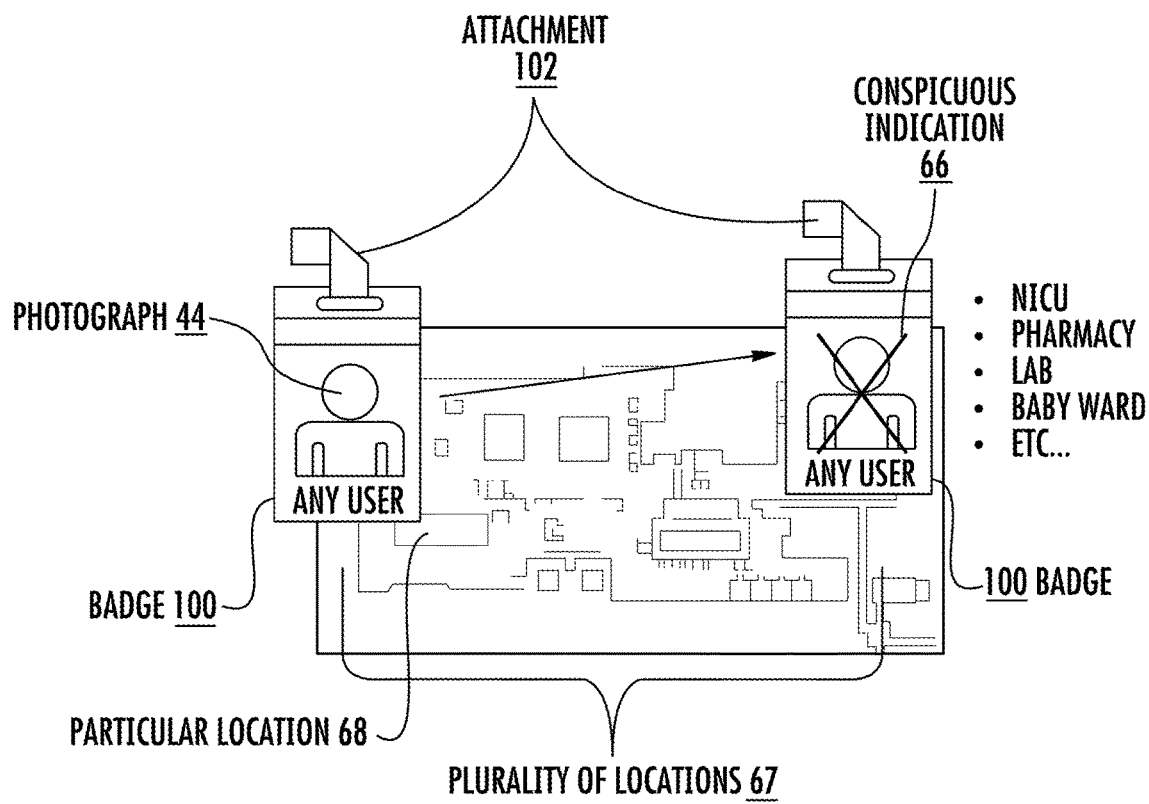
FIG. 6 depicts an example second use scenario, according to an embodiment of the present invention.

FIG. 6 depicts an example second use scenario 60, according to an embodiment of the present invention. In an example embodiment, the visible data corresponding to the identified person may comprise the photograph 44. The photograph 44 comprises a likeness of the identified person rendered visibly on the badge 100.

The conspicuous indication added to the rendered visible data may comprise a distinctive symbol 66, such as a bright and colored (e.g., red, orange, etc.) 'X' symbol, superimposed over the photograph of the person upon the detection of the entry into a particular location 68, within a plurality of locations 67. Personnel, including security agents, viewing the badge 100, in the particular location 68 in which the person lacks a security credential authorizing presence, may readily perceive the distinctive symbol 66, drawing attention to the person wearing the badge as a potentially unauthorized interloper in relation to the particular area 68.

The device 110 may comprise a sensor 114. The sensor 114 may be operable for detecting a location of the badge 100, and thus, of the person wearing the badge, including the particular location in which the rendering of the conspicuous indication 46 may be triggered. The sensor 114 may comprise a microelectromechanical system (MEMS) based sensor such as an accelerometer. The MEMS sensor 114 is operable for detecting a configuration of the badge 100 and this, of the display 115.

The detection of the configuration by the MEMS sensor 114 comprises distinguishing between the first configuration 41 and the second configuration 42. The sensor 114 is also operable for exchanging signals with the processor 111 relating to the detected configuration of the badge 100. The processor 111 may control the display 115 based, at least partially, on the signals exchanged with the MEMS sensor 114 in relation to the detected configuration of the badge 100.

In an example embodiment, the dynamic augmenting of the rendered visible data may also comprise dynamically refreshing the photograph, and/or updating the photograph 44. The augmentation may thus also be based on changes related to the likeness of the identified person. For example, recent weight changes, changes to hair and beard styles, lengths, colors, etc., injury, facial surgery, additions of markings such as tattoos, scars, non-removable jewelry (e.g., certain ear or facial piercings, etc.) may be reflected in freshly captured photographs of the person, with which the photograph 44 may be updated accordingly.

The device 110 may comprise, further, a processor 111, a transmitter/receiver ("transceiver") 112, a sensor 114, and an electrical power source 117. The sensor 114 may also comprise a MEMS based sensor such as an accelerometer. The MEMS sensor 114 is operable for detecting a configuration of the badge 100 and this, of the display 115. The detection of the configuration by the MEMS sensor 114 comprises distinguishing between the first configuration 41 and the second configuration 42. The MEMS sensor 114 is also operable for exchanging signals with the processor 111 relating to the detected configuration of the badge 100. The processor 111 may control the display 115 based, at least partially, on the signals exchanged with the MEMS sensor 114 in relation to the detected configuration of the badge 100.

The electrical power source 117 is operable for energizing the display 115, the processor 111, the transceiver 112, and the sensor 114 via an insulated, conductive power bus 118. The battery may be recharged from an external battery charger via a charging port 109, which may be effectuated using wireline and/or wireless charging techniques. An example embodiment may be implemented in which the electrical power source is supplemented, augmented, and/or extended in relation to operational longevity between recharges, by a photocell 119, which may capture light through the transparent casework of the badge body 101, convert the light to electricity, and supply the electricity to the power source 117.

Figure 2:
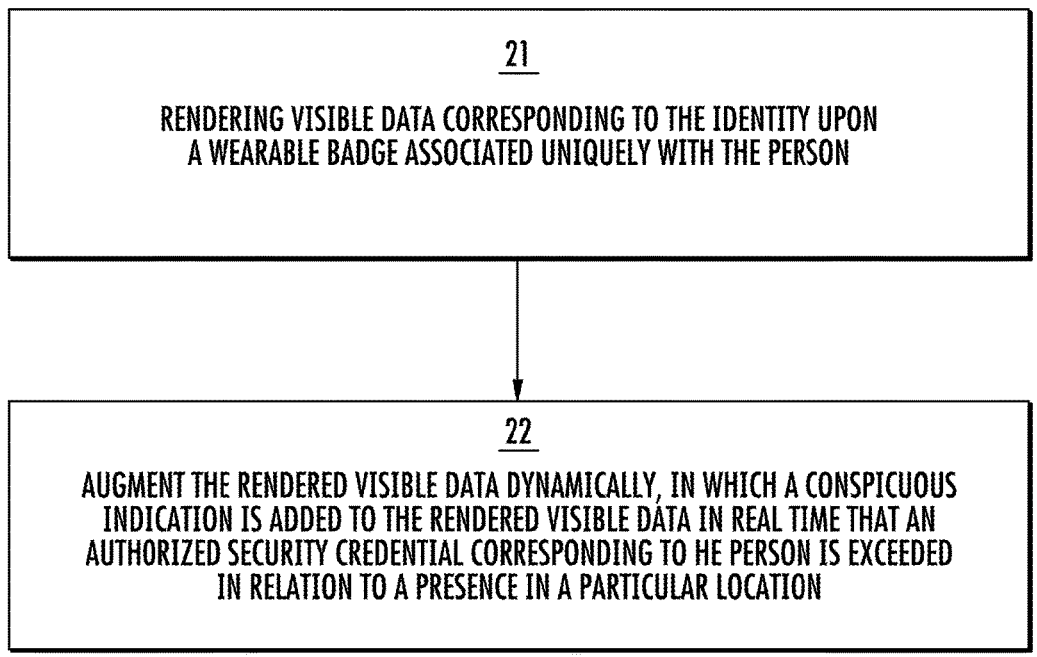
FIG. 2 depicts a flowchart for an example process for presenting visual information relating to an accurate identification of a person, according to an embodiment of the present invention.
Figure 3:
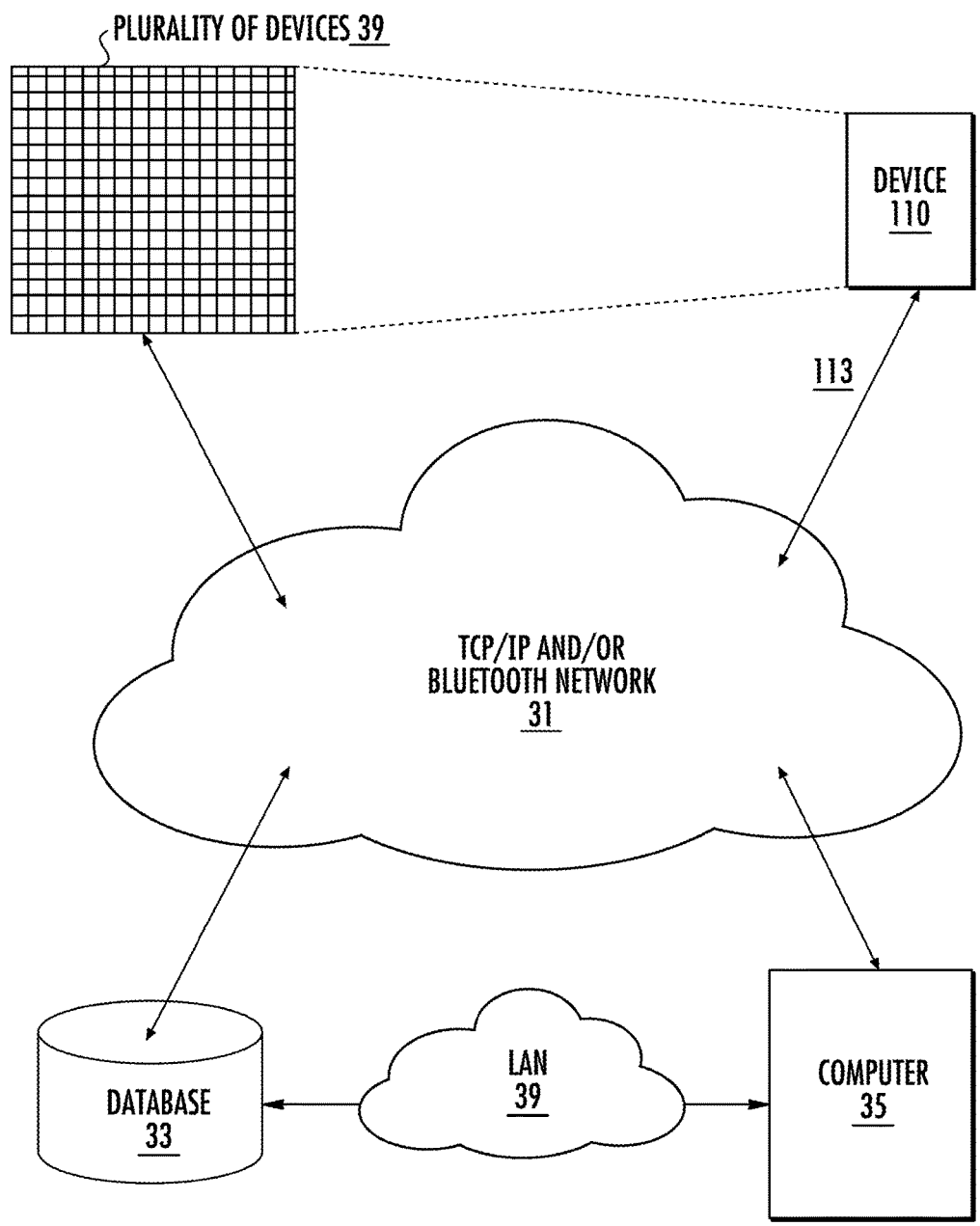
FIG. 3 depicts an example security system, according to an embodiment of the present invention.

The processor 111 is operable for controlling the display 115 in relation to the rendering and augmenting of the visible data. The processor 111 may comprise a non-transitory computer-readable storage medium (CRM) 191. The CRM 191 may comprise memory cells, caches, buffers, latches, registers of the processor 191. Alternatively (or additionally), the CRM may comprise a dynamic, random access memory (RAM) associated with the processor 111, disposed separately therefrom and operable for exchanging data signals therewith within the badge 100. The CRM 191 comprises instructions, which when executed by the processor 111, are operable for causing, configuring, controlling, effectuating, facilitating, and/or programming a process for presenting visual information relating to an accurate identification of a person (e.g., method 20; FIG. 2). An example embodiment may also (or alternatively) be implemented in which the medium 191 is disposed with a database or computer (e.g., database 33, computer 35; FIG. 3), which is external to the badge 100.

The transceiver 112 is operable for exchanging data signals with the processor 111. The transceiver 112 may also exchange data signals 113 wirelessly over a communication network (e.g., network 31; FIG. 3). The data signals relate, at least, to the augmenting of the visible data. The transceiver 112 may be operable for transmitting and receiving the data signals 113 over one or more RF bands. The RF bands may comprise a range of frequencies within an Instrumentation, Scientific and Medical (ISM) frequency band. The transceiver 112 may thus be operable using Bluetooth radio and/or related technology. An example embodiment may be implemented in which the transceiver (Tx/Rx) 112 comprises a low power Bluetooth transceiver.

The device 110 may be operable in relation to a method for presenting visual information relating to an accurate identification of a person. FIG. 2 depicts a flowchart for an example process for presenting visual information relating to an accurate identification of a person, according to an embodiment of the present invention. In a step 201, visible data corresponding to the identity of the person is rendered upon a wearable badge associated uniquely therewith.

In step 22, the rendered visible data are augmented dynamically. The dynamic augmentation comprises adding the conspicuous indication 66 to the rendered visible data, in real time. The dynamic augmentation relates to an authorized security credential corresponding to the person exceeded in relation to a current presence of the person in a particular location.

For example, an entry of the person into the particular current location 68 may be detected. The conspicuous indication 66 is added to an original rendering of the visible data, such as the photograph 44, in real time upon the detection. The conspicuous indication 66 added to the rendered visible data in real time may comprise the distinctive symbol of an orange or red 'X' symbol, superimposed over the photograph 44 upon the detection of an entry of the person into the particular current location 68. An indication, such as a silent alarm, corresponding to the entry may also be annunciated upon the detection.

The visible data corresponding to the person may comprise the photograph 44 corresponding to a likeness of the person. The dynamic augmenting of the rendered visible data may comprise superimposing the conspicuous indication 66 over the photograph 44. The dynamic augmenting of the rendered visible data may also comprise dynamically refreshing the photograph based on a change related to the likeness of the identified person.

The dynamic augmenting of the rendered visible data may comprise exchanging data signals via a communication network. The augmenting of the rendered visible data may comprise updating and/or refreshing the rendered visible data. The data signals exchanged over the communication network relate to the updating and/or refreshing. In an example embodiment, the data signals exchanged over the communication network relate to reporting a position of the badge, and thus, to tracking a location of the person.

The method 20 may be performed in relation to a network based security system. An example embodiment of the present invention relates to a security system. FIG. 3 depicts an example security system 30, according to an embodiment of the present invention.

The security system 30 comprises a network 31, over which data signals may be communicated in real time. The network 31 comprises one or more of Bluetooth related wireless network and/or a packet-switched data and/or communication network operable based on a transfer control protocol and networking protocol such as TCP/IP.

A database 33 is coupled to the network 31. The database 33 comprises information relating to an identity. The information also relates to associated status, corresponding uniquely to each of a plurality of persons. A computer 35, such as a security server, may also be coupled to the network 31. The computer 35 may be coupled, wirelessly or via wireline, to the database 33 over the network 31, and/or over a local area network (LAN) (or other network) 39, adding redundancy and concomitant reliability.

An example embodiment relates to a non-transitory computer readable storage medium comprising instructions, which when executed by a processor, are operable for performing a process, such as the method described herein. The database 33 and/or the network 31 may comprise the computer-readable storage medium. An example embodiment may be implemented in which the non-transitory computer readable storage medium comprises a memory, memory cell, latch, register, cache, buffer, flash storage, or other medium disposed with the processor 111 or elsewhere within the badge 100.

A plurality 39 of devices is operable for exchanging the data signals with the database over the network. The plurality 39 of devices comprises the device 110. Each of the devices, including the device 110, is associated uniquely with a particular one of the persons. Each of the devices, including the device 110, including the device 110, is operable for rendering visible data (e.g., 44; FIG.4) corresponding to the identity and the associated status of the particular one of the persons upon a wearable badge (e.g., badge 100; FIG.1) associated uniquely with that particular person.

Each of the devices, including the device 110, is operable, further, for augmenting the rendered visible data dynamically. The status associated with the particular person comprises a corresponding authorized security credential in relation to a presence of the particular person in each of a plurality 67 of locations (FIG.6), including a particular location 68. Upon the augmenting, the conspicuous indication 66 is added to the rendered visible data, in real time. The conspicuous indication 66 relates to the presence in the particular one 68 of the locations 67, which exceeds the authorized security credential corresponding to the particular person.

Figure 5:
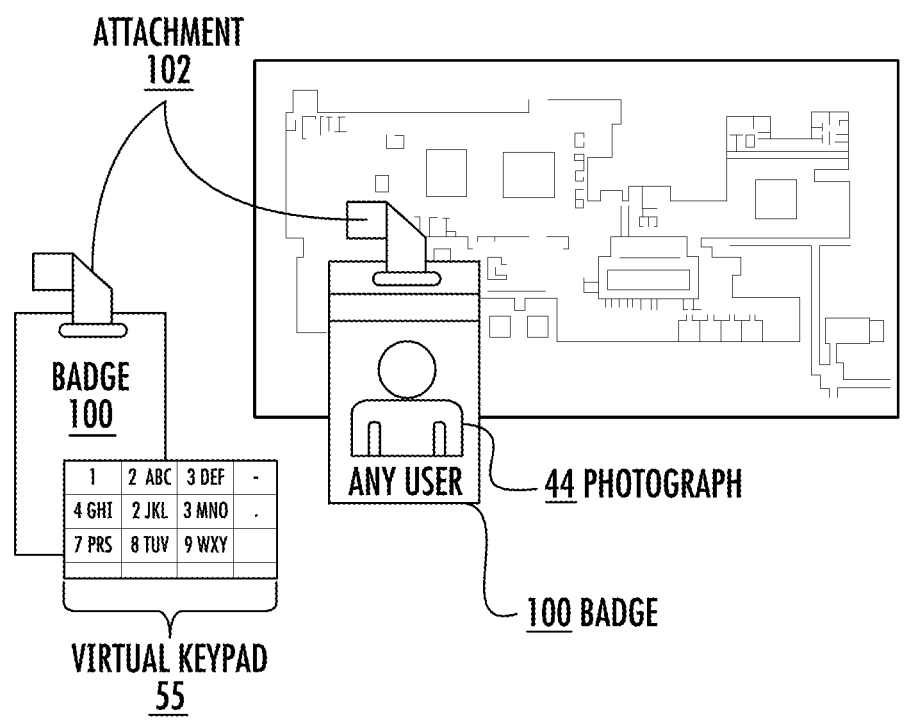
FIG. 5 depicts an example third use scenario, according to an embodiment of the present invention

The badge 100 may be used to authorize entry into a facility, which may be subject to security restrictions) and comprise the plurality of locations 67. FIG. 5 depicts an example third use scenario 50, according to an embodiment of the present invention. Outside the facility and beyond the bounds of the locations 67, the rendering of any information, or at least any security-sensitive information, by the display 115 may be inhibited or prevented. Thus, the badge 100 may appear substantially blank.

An approach to a periphery of the plurality of locations 67, or an entry control point associated therewith, may be detected by the badge 100. Upon the detection, the processor 111 may present a virtual keypad (or another input receiver) 55, which may be rendered visually with the display 115 on a surface of the badge 100. The virtual keypad 55 is operable for receiving haptically actuated inputs relating to an access code, password, or the like. Upon receipt of the access code, the processor 111 may present the photograph 44, and the associated security related information.

Figure 7:
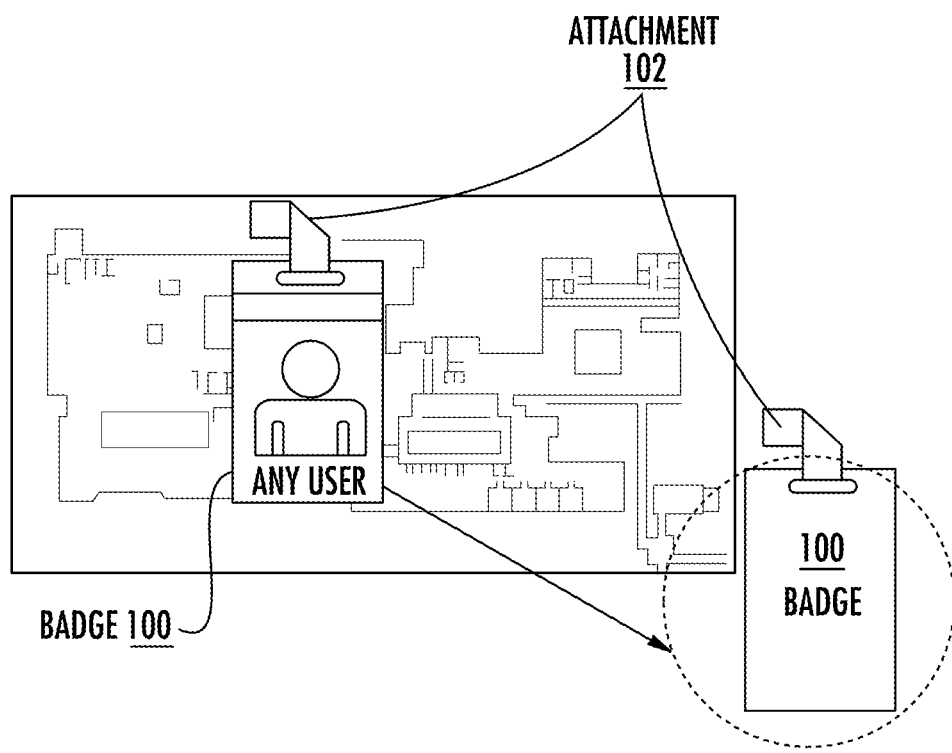
FIG. 7 depicts an example fourth use scenario, according to an embodiment of the present invention.

FIG. 7 depicts an example fourth use scenario 70, according to an embodiment of the present invention. Upon a departure of the person from the plurality of locations 67 (e.g., at an end of a work shift, reassignment to a location elsewhere, commencing off-site travel, etc.), the processor may inhibit, terminate, or obfuscate presentation of the photograph 44 and the associated security related information, and the rendering thereof by the display 115 may cease.

In the event of an emergency or evacuation of the plurality of locations 67, however, the security computer 35, may signal the processor 111 to override the termination of the rendering of the photograph 44, and the associated security-related information, at least temporarily. Thus, personnel evacuated from the plurality of locations 67 in an emergency may be accounted for using the badge 100. Upon accounting for the person upon the evacuation, the override may be terminated and the badge 100 may "go blank" and the display 115 may then cease the rendering of the photograph 44, and the associated security-related information.

* * *

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823;

8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;
U.S. Design Pat. Nos. D716,285;
D723,560;
D730,357;
D730,901;
D730,902;
D733,112;
D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;

U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

\* \* \*

Example embodiments of the present invention are thus useful for providing accurate, up to date information relating to identifying a person using an ID badge. In an example embodiment, the identification information is related to security information relevant throughout large facilities, and over all of the locations the facility may comprise. Example embodiments, further, are operable for providing timely information relevant to a particular person (or relatively small group of persons), among a large population of other persons. The information provided comprises messages directed to that particular person (or small group). The information is provided without adding to the volume of ambient noise within a facility, and without drawing attention from other personnel to whom the message does not relate.

Example embodiments of the present invention are thus described in relation to methods, devices, and systems for presenting visual information relating to an accurate identity of a person. Visible data corresponding to the identity is rendered upon a wearable badge associated uniquely with the person. The visible data rendered are augmented dynamically. The dynamic augmentation comprises adding a conspicuous indication to the rendered visible data, in real time, that an authorized security credential corresponding to the person is exceeded in relation to a presence of the person in a current location.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed is:

1. A method for presenting visual information relating to an accurate identity of a person, the method comprising:
   rendering visible data corresponding to the identity upon a wearable badge associated uniquely with the person, the visible data comprising a photograph of the person;
   augmenting the rendered visible data by dynamically refreshing the photograph based on a change related to the likeness of the identified person, and
   adding a conspicuous indication to the rendered visible data;
   wherein the visible data is augmented and the conspicuous indication is added in real time and in response to the person entering an unauthorized geographical location.

2. The method as described in claim 1, further comprising detecting an entry of the person into the particular location, wherein the conspicuous indication is added to an original rendering of the visible data in real time upon the detection.

3. The method as described in claim 2, wherein the conspicuous indication added to the rendered visible data in real time comprises a distinctive symbol superimposed over the rendered upon the detection of an entry of the person into the particular location.

4. The method as described in claim 2, further comprising annunciating an indication corresponding to the entry upon the detection.

5. The method as described in claim 4, wherein the annunciated indication comprises a silent alarm.

6. The method as described in claim 1, wherein the photograph comprises a likeness of the person.

7. The method as described in claim 6, wherein the dynamic augmenting of the rendered visible data comprises:
   superimposing the conspicuous indication over the photograph.

8. The method as described in claim 1, wherein the dynamic augmenting of the rendered visible data comprises exchanging data signals over a communication network.

9. The method as described in claim 8, wherein the augmenting the rendered visible data dynamically comprises one or more of updating or refreshing the rendered visible data, wherein the data signals exchanged over the communication network relate to the one or more of the updating or the refreshing.

10. The method as described in claim 8, further comprising tracking a location of the person, wherein the data signals exchanged over the communication network relate to reporting a position of the badge.

11. A device for presenting visual information relating to an accurate identity of a person with whom the device is uniquely associated, the device comprising:
   a badge comprising a body, and an attachment coupled to the body and disposed to provide for wearing the device; and
   a display disposed within the badge body, and operable to:
      render visible data corresponding to the identity of a person associated uniquely with the device, the visible data comprising a photograph of the person, and
      augment the rendered visible data by dynamically refreshing the photograph based on a change related to the likeness of the identified person, and
      add a conspicuous indication to the rendered visible data, wherein the visibled data is augmented and the conspicuous indiciation is added in real time and in response to the person entering an unauthorized geographical location.

12. The device as described in claim 11, wherein the display comprises an electronic paper (E-paper) medium and the visible data rendered by the display comprises a mark rendered on the E-paper with an electrophoretic ink (e-ink).

13. The device as described in claim 11, further comprising:
- a processor operable for controlling the display in relation to the rendering and augmenting of the visible data;
- a transceiver operable for exchanging data signals with the processor and over a communication network, the data signals relating to the augmenting of the visible data; and
- a source of electrical power operable for energizing one or more of the display, the processor, or the transceiver.

14. The device as described in claim 11, wherein the device is operable in relation to a detection of an entry of the person into the current location wherein, upon the detection of the entry, an indication related thereto is annunciated.

15. The device as described in claim 11, wherein the photograph comprises a likeness of the identified person.

16. The device as described in claim 15, wherein the conspicuous indication added to the rendered visible data comprises a distinctive symbol superimposed over the photograph of the person upon the detection of the entry.

17. The device as described in claim 11, wherein the display is further operable for rendering one or more of a notification, an alert, or a message relating to the person.

18. The device as described in claim 17, further comprising a sensor operable for detecting an orientation of the badge, wherein, in a first detected orientation, the display is operable for the rendering of the visible data corresponding to the identity, and wherein, in a second detected orientation, the display is operable for the further rendering of the notification, the alert, or the message.

19. A security system, comprising:
- a network, over which data signals may be communicated in real time;
- a database coupled to the network and comprising information relating to an identity and an associated status corresponding uniquely to each of a plurality of persons; and
- a plurality of devices operable for exchanging the data signals with the database over the network, wherein each of the devices is associated uniquely with a particular one of the persons and operable for:
  - rendering visible data corresponding to the identity and the associated status of the particular one of the persons upon a wearable badge associated uniquely with the particular one of the persons, the rendered visible data comprising a photograph of the person; and
  - augmenting the rendered visible data by dynamically refreshing the photograph based on a change related to the likeness of the identified person; and
  - adding a conspicuous indication to the rendered visible data;
- wherein the visible data is augmented and the conspicuous indiciation is added in real time, and in response to the particular one of the persons being in an unauthorized geographical location.

* * * * *